United States Patent [19]
Yanagi et al.

[11] Patent Number: 5,528,627
[45] Date of Patent: Jun. 18, 1996

[54] SIGNAL RECEPTION SYSTEM COMPRISING AN ADAPTIVE FILTER

[75] Inventors: Shuzo Yanagi; Akihisa Ushirokawa, both of Tokyo, Japan

[73] Assignee: NEC Corporation, Japan

[21] Appl. No.: 379,864

[22] Filed: Jan. 27, 1995

[30] Foreign Application Priority Data

Jan. 28, 1994 [JP] Japan .................................. 6-008212

[51] Int. Cl.$^6$ ........................... H03H 7/30; G06F 17/10
[52] U.S. Cl. ..................................... 375/232; 364/724.19
[58] Field of Search ................................... 375/229, 230, 375/232, 233, 236, 346, 348; 364/724.2, 724.19

[56] References Cited

U.S. PATENT DOCUMENTS 4,580,275  4/1986  Pirani et al. ........................... 375/236
5,159,609  10/1992  Palicot ..................................... 375/232

Primary Examiner—Stephen Chin
Assistant Examiner—Kevin Kim
Attorney, Agent, or Firm—Ostrolenk, Faber, Gerb & Soffen

[57] ABSTRACT

In a signal reception system comprising an adaptive filter having a plurality of filter coefficients and producing a filtered signal, a differential detection circuit for carrying out differential detection operation by the use of a delayed signal wherein the filtered signal is delayed, and an error signal generation circuit for generating an error signal, the adaptive filter adjusts the plurality of filter coefficients in accordance with the error signal. An error signal control circuit has a threshold value and supplies the error signal to the adaptive filter only when the delayed signal has a signal value which is higher than the threshold value.

5 Claims, 5 Drawing Sheets 5,528,627

SIGNAL RECEPTION SYSTEM COMPRISING AN ADAPTIVE FILTER

BACKGROUND OF THE INVENTION

This invention relates to a signal reception system comprising an adaptive filter and a differential detection circuit.

Generally, such a signal reception system comprises a demodulation circuit, an adaptive filter, a differential detection circuit, and an error signal generation circuit. The demodulation circuit demodulates a reception signal into a demodulated signal. The reception signal is carried by a carrier wave through a transmission path. The transmission path has transmission characteristic which varies with a lapse of time. The adaptive filter has a plurality of filter coefficients. The adaptive filter carries out compensation operation of the transmission characteristic by the use of a high speed adaptive algorithm and produces a filtered signal. The differential detection circuit carries out differential detection operation in the manner known in the art. In the differential detection operation, a delayed signal is generated by the use of the filtered signal. Namely, the delayed signal is derived from a delayed operation that the filtered signal is delayed by a single symbol duration. The delayed signal serves as a standard of the carrier wave. The differential detection operation is carried out by the use of the filtered signal and the delayed signal.

As a result of the differential detection operation, the differential detection circuit produces a synchronized signal synchronized with the phase of the carrier wave. The error signal generation circuit generates an error signal representative of an error between a predetermined reference signal and the synchronized signal. The adaptive filter is supplied with the error signal and adjusts the plurality of filter coefficients in accordance with the error signal so that a root mean square of the error becomes a minimum value. By the use of the high speed adaptive algorithm, the error can be converged in high speed.

In such a signal reception system, when the delayed signal has an extremely small signal value which closes to zero, phase information included in the delayed signal extremely decreases. This means that the synchronized signal has a degraded reliability. In this case, it often causes a phenomenon that the error of the error signal becomes large because the synchronized signal has the degraded reliability. As a result, the plurality of filter coefficients are updated by error. In the high speed adaptive algorithm to which the error is converged in high speed, convergence of the high speed is degraded on occurrence of the above-mentioned phenomenon because update of the plurality of filter coefficients depends heavily on the error of the error signal.

SUMMARY OF THE INVENTION

It is therefore an object of this invention to provide a signal reception system which is capable of preventing from an error update of a plurality of filter coefficients of an adaptive filter.

Other objects of this invention will become clear as the description proceeds.

On describing the gist of this invention, it is possible to understand that a signal reception system comprises a demodulation circuit for demodulating a reception signal into a demodulated signal. The reception signal is carried by a carrier wave and is propagated through a transmission path having transmission characteristic. The signal reception system further comprises an adaptive filter having a plurality of filter coefficients and connected to the demodulation circuit for carrying out compensation operation of the transmission characteristic by the use of a high speed adaptive algorithm to produce a filtered signal, a differential detection circuit connected to the adaptive filter for carrying out differential detection operation by the use of a first delayed signal wherein the filtered signal is delayed. The differential detection circuit produces a synchronized signal synchronized with a phase of the carrier wave. An error signal generation circuit is connected to the differential detection circuit for generating an error signal representative of an error between a predetermined reference signal and the synchronized signal. The adaptive filter is supplied with the error signal and adjusts the plurality of coefficients in accordance with the error signal so that the error signal has a minimum error.

According to this invention, the input reception system further comprises an error signal control circuit having a threshold value and connected to the differential detection circuit and the error signal generating circuit for controlling supply of the error signal to the adaptive filter. The error signal control circuit supplies the error signal to the adaptive filter when the first delayed signal has a signal value which is higher than the threshold value. The error signal control circuit stops supply of the error signal when the first delayed signal has the signal value which is not higher than the threshold value.

DESCRIPTION OF THE PREFERRED EMBODIMENT

Figure 1:
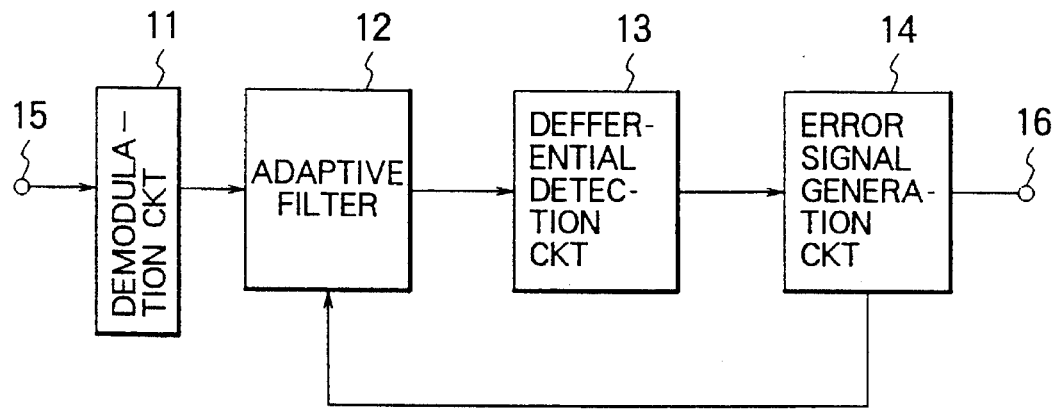
FIG. 1 shows a block diagram of a conventional signal reception system.

Referring to FIG. 1, description will be made at first as regards a conventional signal reception system in order to facilitate an understanding of this invention. The signal reception system comprises a demodulation circuit 11, an adaptive filter 12, a differential detection circuit 13, and an error signal generation circuit 14. The demodulation circuit 11 receives a reception signal through an input terminal 15 and demodulates the reception signal into a demodulated signal. The reception signal is carried by a carrier wave through a transmission path. The transmission path has transmission characteristic which varies with a lapse of time. In other words, the reception signal has a reception signal level which varies with a lapse of time. As will later be described in detail, the adaptive filter 12 has a plurality of filter coefficients and carries out compensation operation of the transmission characteristic by the use of a high speed adaptive algorithm. As a result of the compensation operation, the adaptive filter 12 produces a filtered signal.

The differential detection circuit 13 carries out differential detection operation in the manner known in the art. In the differential detection circuit 13, a delayed signal is generated by the use of the filtered signal. Namely, the delayed signal is derived from a delayed operation that the filtered signal is delayed by a single symbol duration. The delayed signal serves as a standard of a phase of the carrier wave. The differential detection operation is carried out by the use of the filtered signal and the delayed signal.

As a result of the differential detection operation, the differential detection circuit 13 produces a synchronized signal synchronized with the phase of the carrier wave. The error signal generation circuit 14 generates an error signal representative of an error between a predetermined reference signal and the synchronized signal. The error signal is used for updating the plurality of filter coefficients of a next time in the adaptive filter 12. For this purpose, the adaptive filter 12 is supplied with the error signal and adjusts the plurality of filter coefficients in accordance with the error signal so that a root mean square of the error becomes a minimum value. By the use of the high speed adaptive algorithm, the error can be converged in high speed.

In the signal reception system mentioned above, when the delayed signal has an extremely small signal value which closes to zero, phase information included in the delayed signal extremely decreases. This means that the synchronized signal delivered from the differential detection circuit 13 has a degraded reliability. In this case, it causes a phenomenon that the error of the error signal becomes large because the synchronized signal has the degraded reliability. As a result, the plurality of filter coefficients are updated by error. In the high speed adaptive algorithm, convergence of the high speed is degraded on occurrence of the above-mentioned phenomenon because update of the plurality of filter coefficients depends heavily on the error of the error signal.

Figure 2:
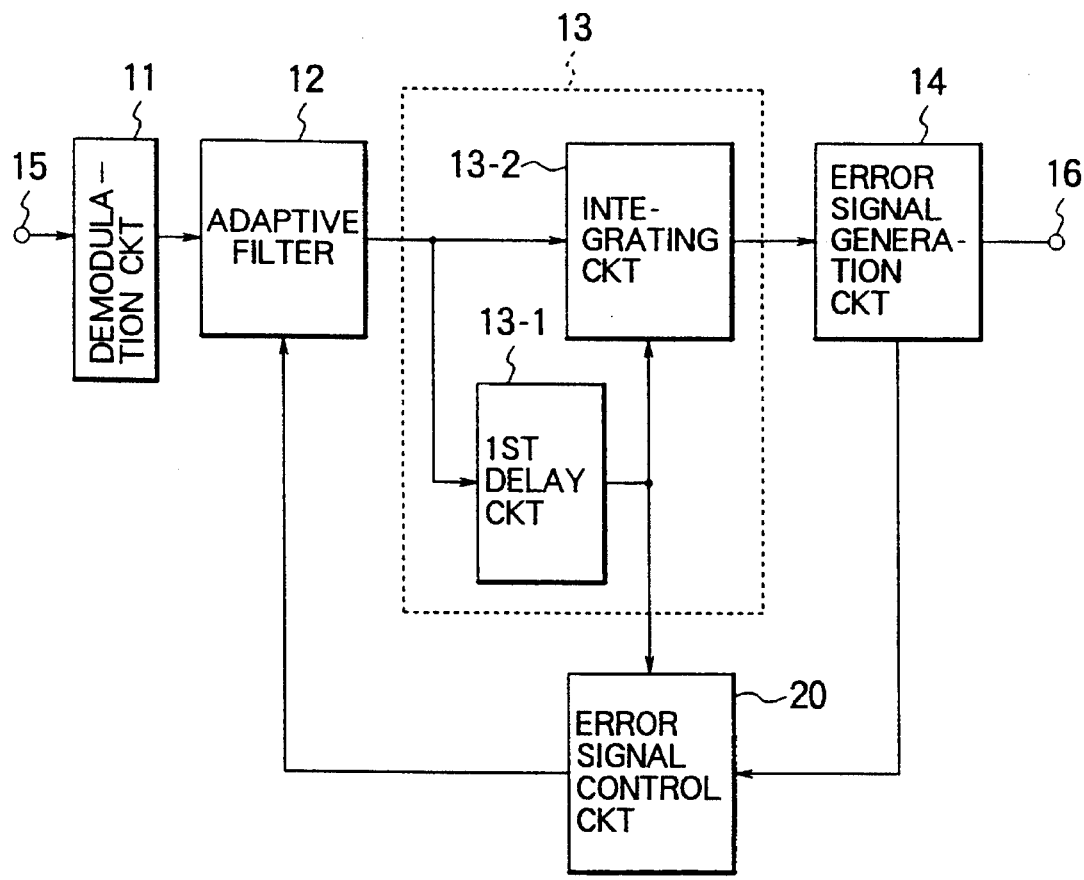
FIG. 2 shows a block diagram of a signal reception system according to a preferred embodiment of this invention.

Referring to FIG. 2, the description will proceed to a signal reception system according to a preferred embodiment of this invention. The signal reception system comprises similar parts designated by like reference numerals except for an error signal control circuit 20. In the example, a PSK (phase shift keying) modulated signal is used as an example of the reception signal. The demodulation circuit 11 receives the reception signal through the input terminal 15 and demodulates the reception signal into the demodulated signal.

As will become clear, the adaptive filter 12 has first through M-th filter coefficients where M represents a positive integer. The adaptive filter 12 carries out the compensation operation of the transmission characteristic by the use of the high speed adaptive algorithm. As an example of the high speed adaptive algorithm, RLS (recursive least square) algorithm is used. Such an adaptive filter is disclosed in an article which is published by GENDAI KOGAKUSHA and which is written by Simon Haykin under the title of "AN INTRODUCTION TO AN ADAPTIVE FILTER", September 1987, which is herein incorporated by reference. As a result of the compensation operation, the adaptive filter 12 produces a filtered signal.

The differential detection circuit 13 comprises a first delay circuit 13-1 and an integrating circuit 13-2 and carries out differential detection operation in the manner known in the art. The first delay circuit 13-1 is supplied with the filtered signal and gives a first delay duration to the filtered signal. The first delay duration is equal to a single symbol duration of the reception signal. The first delay circuit 13-1 delivers a first delayed signal having the first delay duration to the integrating circuit 13-2 and the error signal control circuit 20. The first delayed signal has a signal value defined by a vector space and serves as a standard of a phase of the carrier wave. The integrating circuit 13-2 integrates the filtered signal and the first delayed signal. As a result of the differential detection operation, the differential detection circuit 13 produces the synchronized signal synchronized with the phase of the carrier wave. The error signal generation circuit 14 generates the error signal representative of the error between the predetermined reference signal and the synchronized signal. The error signal is for updating the first through the M-th filter coefficients of a next time in the adaptive filter 12.

The error signal control circuit 20 has a threshold value and is supplied with the error signal and the first delayed signal. The error signal control circuit 20 decides whether or not the first delayed signal has the signal value which is higher than the threshold value. The error signal control circuit 20 delivers the error signal to the adaptive filter 12 at those state, when the signal value is higher than the threshold value. When the signal value is not higher than the threshold value, the error signal control circuit 20 stops supply of the error signal to the adaptive filter 12. Thus, only when the signal value of the first delayed signal is higher than the threshold value, the first through the M-th filter coefficients are adjusted or updated in accordance with the error signal so that a root means square of the error becomes a minimum value.

If the first delayed signal has an extremely small signal value, phase information included in the first delayed signal extremely decreases. In this case, a signal value of the synchronized signal becomes extremely small, even if the filtered signal has a correct information. It causes a phenomenon that the error signal has a large value. However, the error signal control circuit 20 stops supply of the error signal to the adaptive filter 12 because the first delayed signal has the signal value which is not higher than the threshold value. In this event, update operation of the first through the M-th filter coefficients is never carried out. Accordingly, it is possible to prevent error update operation of the first through the M-th filter coefficients.

In the case that the RLS algorithm is used as the high speed adaptive algorithm, an update value of one of the first through the M-th filter coefficients is given by:

$$h(n)=h(n-1)+k(n)\eta(n),$$

where h(n−1) represents the former filter coefficient before updating, k(n) represents a gain vector. η(n) represents the error of the error signal. Such an RLS algorithm is disclosed in an article referred to before. In the RLS algorithm, in comparison with the LMS (least mean square) algorithm, it has a large variation of the filter coefficients as against the error of the error signal in an initial pull-in process. This means that it is possible to converge in high speed by preventing from the error update of the filter coefficients.

Figure 3:
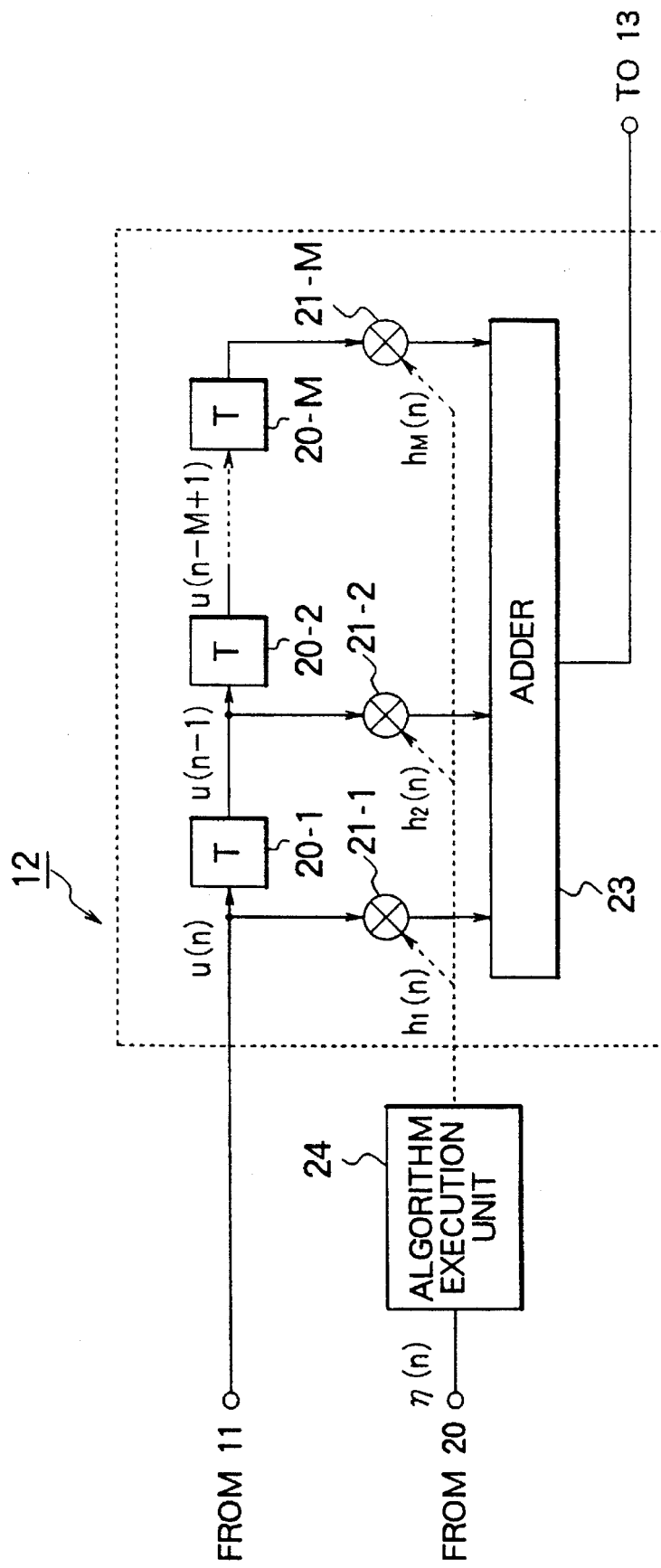
FIG. 3 shows a block diagram of an adaptive filter illustrated in FIG. 2.

Referring to FIG. 3, the description will be made as regards the adaptive filter 12. For example, the adaptive filter 12 can be implemented by a transversal type filter having first through M-th taps. The adaptive filter 12 comprises first through M-th delay units 20-1 to 20-M, first through M-th multipliers 21-1 to 21-M, an adder 23, and an algorithm execution unit 24. Each of the first through the M-th delay units 20-1 to 20-M is for giving a delay time duration T. In the example, the delay time duration T is equal to a single sampling time duration. The algorithm execution unit 24 is for executing the RLS algorithm in response to the error signal and comprises a memory for memorizing a plurality of filter coefficient groups each of which corresponds to the error and which consists of the first through the M-th filter coefficients.

In FIG. 3, the first delay unit 20-1 is supplied with the demodulated signal, as a filter input signal, from the demodulation circuit 11 (FIG. 2). At a time instant n, the filter input signal is represented by u(n). The first multiplier 21-1 multiplies the filter input signal u(n) and the first filter coefficient $h_1(n)$ into a first multiplied signal representative of $u(n)h_1(n)$. The first multiplied signal is supplied to the adder 23. The first delay unit 20-1 gives the delay time duration T to the filter input signal and produces a first delayed filter signal which is represented by u(n−1). A second multiplier 21-2 multiplies the first delayed filter signal and a second filter coefficient $h_2(n)$ into a second multiplied signal representative of $u(n-1)h_2(n)$. The second multiplied signal is supplied to the adder 23.

Similarly, the M-th delay unit 20-M is supplied with an (M-1)-th delayed filter signal represented by n(n−M+1) and produces an M-th delayed filter signal represented by n(n-M). The M-th multiplier 21-M multiplies the M-th delayed filter signal u(n-M) and the M-th filter coefficient $h_M(n)$ into an M-th multiplied signal representative of $u(n-M)h_M(n)$. The M-th multiplied signal is supplied to the adder 23. The adder 23 adds the first through the M-th multiplied signals and produces an added signal given by:

$$y(n) = \sum_{k=1}^{M} u(n-k+1)h(k).$$

The added signal is supplied to the differential detection circuit 13.

The algorithm execution unit 24 is supplied with the error signal representative of η(n) from the error signal generation circuit 14 (FIG. 2). Responsive to the error signal, the algorithm execution units 24 executes the RLS algorithm and updates the first through the M-th filter coefficients $h_1(n)$ to $h_M(n)$ to first through M-th filter coefficients $h_1(n+1)$ to $h_M(n+1)$, respectively. The first through the M-th multipliers 21-1 to 21-M carry out calculation in accordance with the first through the M-th filter coefficients $h_1(n+1)$ to $h_M(n+1)$, respectively.

Figure 4:
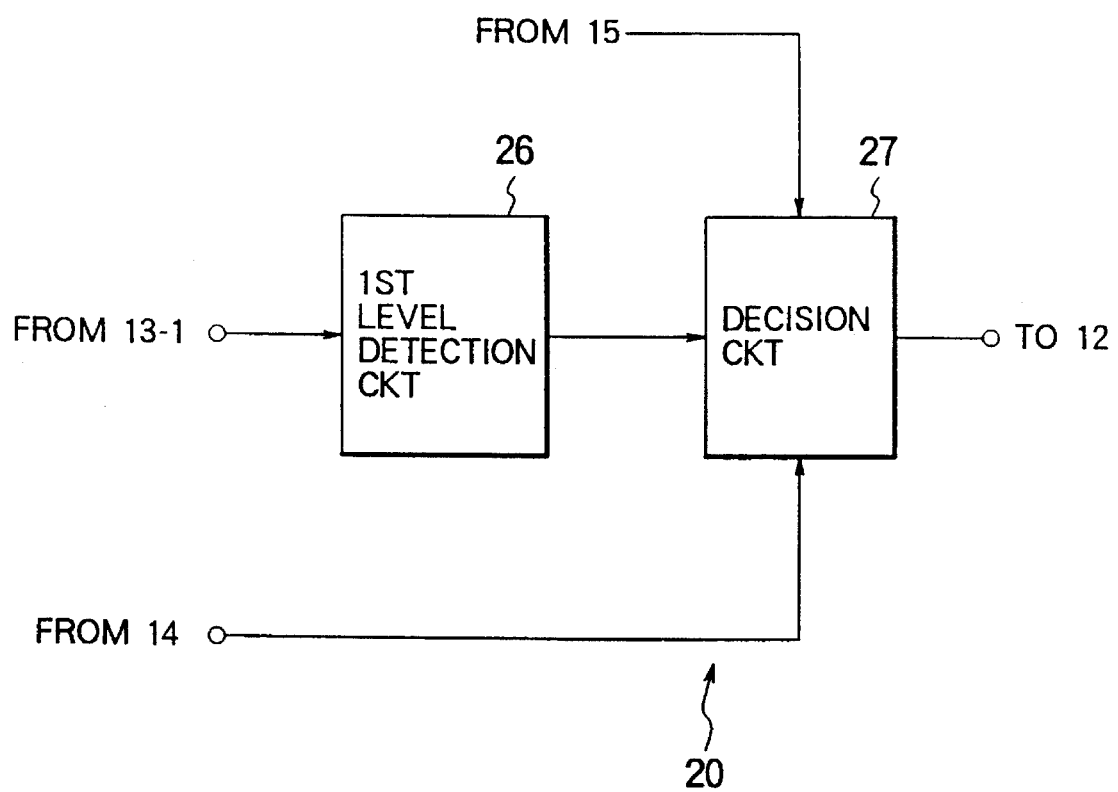
FIG. 4 shows a block diagram of an error signal control circuit illustrated in FIG. 2.

Referring to FIG. 4, the description will proceed to the error signal control circuit 20. The error signal control circuit 20 comprises a first level detection circuit 26 and a decision circuit 27. The first level detection circuit 26 is supplied with the first delayed signal from the first delay circuit 13-1 (FIG. 2) and detects, as the signal value, an amplitude level of the first delayed signal. The first level detection circuit 26 delivers a first detected level signal representative of the amplitude level to the decision circuit 27. The decision circuit 27 is supplied with the first detected level signal and the error signal. The decision circuit 27 has a predetermined threshold level as the threshold value which closes to zero and decides whether or not the amplitude level is higher than the predetermined threshold level. The decision circuit 27 supplies the error signal to the adaptive filter 12 when the amplitude level is higher than the predetermined threshold level. The decision circuit 27 stops supply of the error signal when the amplitude level is not higher than the predetermined threshold level. In other words, the decision circuit 27 delivers a signal having a zero value when the amplitude level is not higher than the predetermined threshold level.

It is desirable that the decision circuit 27 is supplied with the reception signal through the input terminal 15. The reception signal can be used for changing the predetermined threshold level in the decision circuit 27. In other words, the predetermined threshold level may be adjusted in accordance with the variation of the reception signal level of the reception signal. This is because the reception signal level of the reception signal varies with a lapse of time. Namely, the predetermined threshold level may become an undesirable level when the reception signal has a large variation. For the reason, it is desirable that the threshold level is changed in accordance with the reception signal level.

Figure 5:
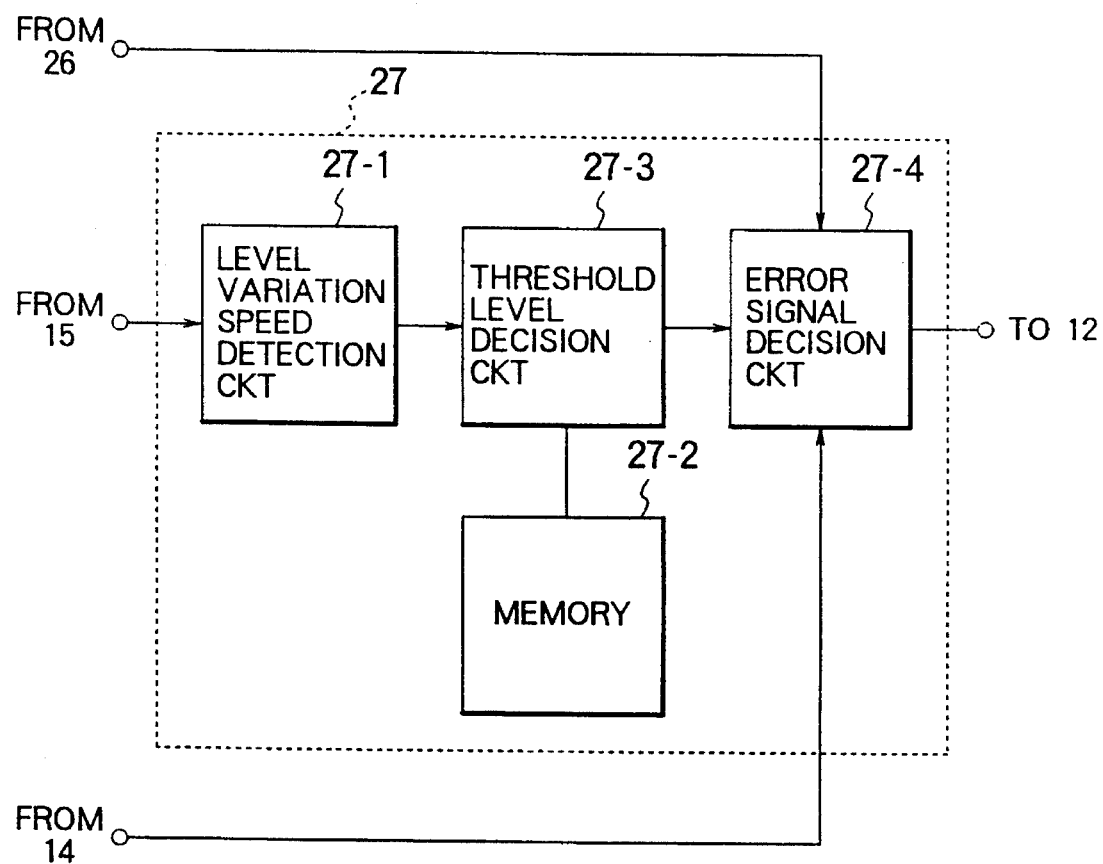
FIG. 5 shows a block diagram of a decision circuit illustrated in FIG. 4.

Referring to FIG. 5, the decision circuit 27 comprises a level variation speed detection circuit 27-1, a memory 27-2, a threshold level decision circuit 27-3, and an error signal decision circuit 27-4. The level variation speed detection circuit 27-1 is supplied with the reception signal and detects a level variation speed of the reception signal level in a predetermined time duration T1. The level variation speed detection circuit 27-1 produces a detected speed signal representative of 1.5 the level variation speed.

In the example, the level variation speed of the reception signal level is classified into a plurality of ranges. The memory 27-2 memorizes a plurality of threshold levels which correspond to the plurality of ranges. The threshold level decision circuit 27-3 is for deciding one of the plurality of threshold levels as a decided threshold level in accordance with the level variation speed of the detected speed signal. In other words, the threshold level decision circuit 27-3 reads from the memory 27-2 one of the plurality of threshold levels that corresponds to one of the plurality of ranges including the level variation speed of the detected speed signal. The threshold value decision circuit 27-3 delivers a decided level signal representative of the decided threshold level. Thus, the threshold level is changed in accordance with the reception signal level.

The error signal decision circuit 27-4 is supplied with the first detected level signal representative of the amplitude level of the first delayed signal, the error signal, and the decided level signal. Supplied with the decided level signal, the error signal decision circuit 27-4 decides whether or not the amplitude level of the first delayed signal is higher than the decided threshold level. The error signal decision circuit 27-4 supplies the error signal to the adaptive filter 12 when the amplitude level is higher than the decided threshold level. The error signal decision circuit 27-4 stops supply of the error signal when the amplitude level is not higher than the decided threshold level.

Figure 6:
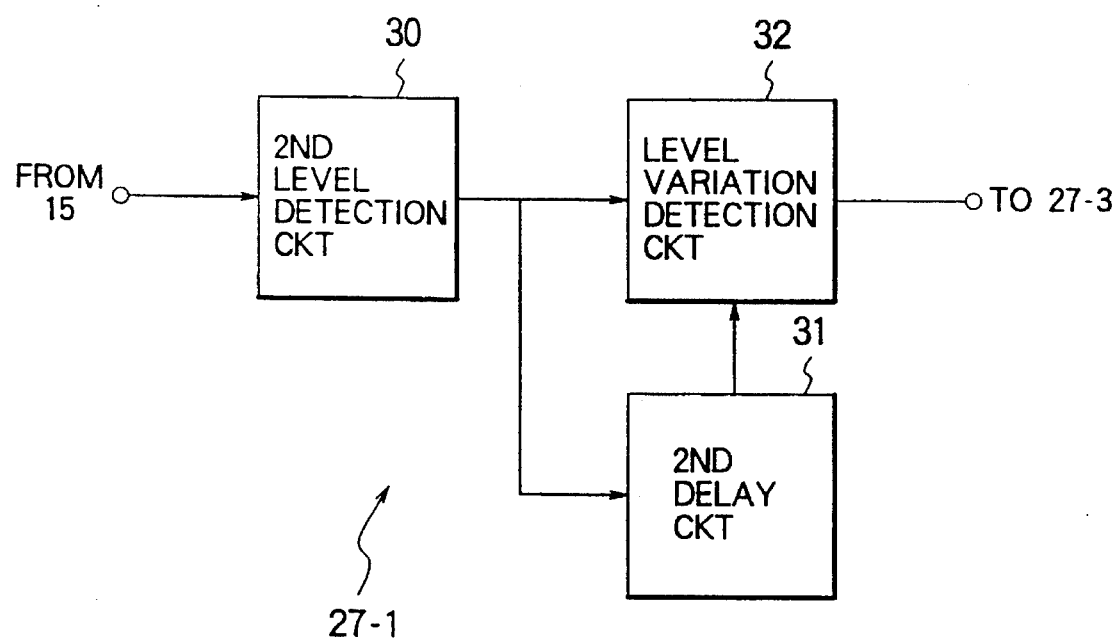
FIG. 6 shows a block diagram of a level variation speed detection circuit illustrated in FIG. 5.

Referring to FIG. 6, the level variation speed detection circuit 27-1 comprises a second level detection circuit 30, a second delay circuit 31, and a level variation detection circuit 32. The second level detection circuit 30 is supplied with the reception signal through the input terminal 15 (FIG. 2). The second level detection circuit 30 detects the reception signal level and produces a second detected level signal representative of the reception signal level. The second delay circuit 31 is for giving a delay which is equal to the predetermined time duration T1 described in conjunction with the level variation speed detection circuit 27-1 (FIG. 5) to the second detected level signal. The second delay circuit 31 supplies a second delayed signal having the delay of the predetermined time duration T1 to the level variation detection circuit 32. Supplied with the second detected level signal and the second delayed signal, the level variation detection circuit 32 detects a level difference between the second detected level signal and the second delayed signal and delivers a level difference signal representative of the level difference to the threshold level decision circuit 27-3 (FIG. 5) as the detected speed signal.

While this invention has thus far been described in conjunction with a preferred embodiment thereof, it will readily be possible for those skilled in the art to put this invention into practice in various other manners. For example, although the description is made in the case that the reception signal is the PSK modulated signal, the signal reception system according to this invention can be applied to other modulated signals, such as a DPSK (differential phase shift keying) modulated signal.

What is claimed is:

1. A signal reception system, comprising: a demodulation circuit for demodulating a reception signal into a demodulated signal, said reception signal being carried by a carrier wave and being propagated through a transmission path having transmission characteristic, an adaptive filter having a plurality of filter coefficients and connected to said demodulation circuit for carrying out compensation operation of said transmission characteristic by the use of a high speed adaptive algorithm to produce a filtered signal, a differential detection circuit connected to said adaptive filter for carrying out differential detection operation by the use of said filter signal and a first delayed signal wherein said filtered signal is delayed, said differential detection circuit producing a synchronized signal synchronized with a phase of said carrier wave, and an error signal generation circuit connected to said differential detection circuit for generating an error signal representative of an error between a predetermined reference signal and said synchronized signal, said adaptive filter being supplied with said error signal and adjusting said plurality of coefficients in accordance with said error signal so that said error signal has a minimum error, and an error signal control circuit having a threshold value and connected to said differential detection circuit and said error signal generating circuit for controlling supply of said error signal to said adaptive filter, said error signal control circuit supplying said error signal to said adaptive filter when said first delayed signal has a signal value which is higher than said threshold value, said error signal control circuit stopping supply of said error signal when said first delayed signal has the signal value which is not higher than said threshold value.

2. A signal reception system as claimed in claim 1, wherein said differential detection circuit comprises:

a first delay circuit connected to said adaptive filter for giving a delay equal to a single symbol duration to said filtered signal to produce said first delayed signal; and an integrating circuit connected to said adaptive filter and said first delay circuit for integrating said filtered signal and said first delayed signal to produce an integrated signal as said synchronized signal.

3. A signal reception system as claimed in claim 2, wherein said error signal control circuit comprises:

a first level detection circuit connected to said first delay circuit for detecting an amplitude level of said first delayed signal as said signal value to produce a first detected level signal representative of said amplitude level; and a decision circuit having a threshold level as said threshold value and connected to said error signal generation circuit and said first level detection circuit for deciding whether or not said amplitude level is higher than said threshold level, said decision circuit supplying said error signal to said adaptive filter when said amplitude level is higher than said threshold level, said decision circuit stopping supply of said error signal when said amplitude level is not higher than said threshold level.

4. A signal reception system as claimed in claim 3, said reception signal having a reception signal level which varies with a lapse of time, wherein said decision circuit comprises:

a level variation speed detection circuit supplied with said reception signal for detecting a level variation speed of said reception signal level in a predetermined time duration to produce a detected speed signal representative of said level variation speed, said level variation speed being classified into a plurality of ranges;

a memory for memorizing a plurality of threshold levels which correspond to said plurality of ranges, respectively;

threshold level decision circuit connected to said level variation detection circuit and said memory for deciding one of said plurality of threshold levels as a decided threshold level by accessing said memory in accordance with said level variation speed, said threshold level decision circuit producing a decided level signal representative of said decided threshold level; and an error signal decision circuit connected to said error signal generation circuit, said first level detection circuit, and said threshold level decision circuit for deciding whether or not said amplitude level of said first delayed signal is higher than said decided threshold level, said error signal decision circuit supplying said error signal to said adaptive filter when said amplitude level is higher than said decided threshold level, said error signal decision circuit stopping supply of said error signal when said amplitude level is not higher than said decided threshold level.

5. A signal reception system as claimed in claim 4, wherein said level variation speed detection circuit comprises:

a second level detection circuit supplied with said reception signal for detecting said reception signal level to produce a second detected level signal representative of said reception signal level;

a second delay circuit for giving a delay of said predetermined time duration to said second detected level signal to produce a second delayed signal having the delay of said predetermined time duration; and a level variation detection circuit connected to said second level detection circuit and said second delay circuit for detecting a level difference between said second detected level signal and said second delayed signal to produce a level difference signal as said detected speed signal.

* * * * *